US010975956B2

(12) United States Patent
Dorschel et al.

(10) Patent No.: US 10,975,956 B2
(45) Date of Patent: Apr. 13, 2021

(54) FORCE TRANSMISSION DEVICE FOR A TRANSMISSION

(71) Applicant: HS PRODUCTS ENGINEERING GMBH, Maisach (DE)

(72) Inventors: Florian Dorschel, Herrsching (DE); Thomas Heckmayr, Rammingen (DE); Ullrich Juling, Prien (DE); Martin Specht, Feldafing (DE)

(73) Assignee: HS PRODUCTS ENGINEERING GMBH, Maisach (DE)

( * ) Notice: Subject to any disclaimer, the term of this patent is extended or adjusted under 35 U.S.C. 154(b) by 693 days.

(21) Appl. No.: 15/115,508

(22) PCT Filed: Jan. 30, 2015

(86) PCT No.: PCT/EP2015/051977
§ 371 (c)(1),
(2) Date: May 10, 2017

(87) PCT Pub. No.: WO2015/114109
PCT Pub. Date: Aug. 6, 2015

(65) Prior Publication Data
US 2017/0254410 A1    Sep. 7, 2017

(30) Foreign Application Priority Data

Jan. 31, 2014    (DE) ..................... 10 2014 101 189.9

(51) Int. Cl.
*F16H 59/04*       (2006.01)
*F16H 61/26*       (2006.01)
(Continued)

(52) U.S. Cl.
CPC .......... *F16H 59/044* (2013.01); *B62M 25/06* (2013.01); *F16H 61/24* (2013.01); *F16H 61/26* (2013.01);
(Continued)

(58) Field of Classification Search
CPC .................. B62M 25/06; F16H 59/044; F16H 2059/0239; F16H 63/502; F02D 11/02
(Continued)

(56) References Cited

U.S. PATENT DOCUMENTS 3,129,571 A  *  4/1964  Reynolds ............ B25B 23/1405
                                                    267/154
3,321,988 A  *  5/1967  Peras ..................... F16H 3/0915
                                                    74/411

(Continued)

FOREIGN PATENT DOCUMENTS

DE          29812605 U1       9/1998
DE       102009015057 A1     10/2009
(Continued)

OTHER PUBLICATIONS

PCT/EP2015/051977—International Search Report (with translation) and Written Opinion dated May 12, 2015, 12 pages.
(Continued)

*Primary Examiner* — William C Joyce
*Assistant Examiner* — T. Scott Fix
(74) *Attorney, Agent, or Firm* — Haynes Beffel & Wolfeld LLP; Andrew L. Dunlap

(57) ABSTRACT

The invention pertains to a force transmitting device (100) for a transmission (200), particularly of a motorcycle, with a shift assist system, featuring a shift input shaft (30) with a shift lever connection (20) for receiving a shifting motion of a shift lever (300) and a transmission connection (40) for transmitting the shifting motion to a gear shifting gate (110) of the transmission (100), wherein the shift input shaft (30) features an energy accumulator (32) for the intermediate storage of at least part of the shifting force such that the relative motion between the shift lever connection (20) and the transmission connection (40) can be realized by chang-
(Continued)

ing the shifting force stored in the energy accumulator (32), and wherein the shift input shaft (30) features a sensor device (60) for detecting the relative motion between the shift lever connection (20) and the transmission connection (40).

13 Claims, 12 Drawing Sheets

(51) Int. Cl.
    *B62M 25/06*     (2006.01)
    *F16H 61/24*     (2006.01)
    *F16H 59/02*     (2006.01)

(52) U.S. Cl.
    CPC ............... *F16H 2059/0234* (2013.01); *F16H 2059/0239* (2013.01); *F16H 2059/0295* (2013.01); *F16H 2061/241* (2013.01); *F16H 2061/242* (2013.01)

(58) Field of Classification Search
    USPC ........ 267/154, 273, 277, 279, 281, 282, 284
    See application file for complete search history.

(56) References Cited

U.S. PATENT DOCUMENTS

| | | | | |
|---|---|---|---|---|
| 3,664,202 | A * | 5/1972 | Metzger | G01D 5/06 74/18.1 |
| 3,890,803 | A * | 6/1975 | Neal | F16D 59/00 464/97 |
| 3,984,997 | A * | 10/1976 | Dossier | F16D 43/211 464/60 |
| 4,061,051 | A * | 12/1977 | Grandis | B62M 25/06 74/473.16 |
| 4,593,889 | A * | 6/1986 | Odobasic | B64C 27/33 267/141.1 |
| 4,659,069 | A * | 4/1987 | Odobasic | B64C 25/64 244/104 R |
| 4,884,790 | A * | 12/1989 | Castrilli | B60G 21/055 267/154 |
| 5,174,172 | A * | 12/1992 | Kanemura | B60W 10/06 477/102 |
| 5,478,059 | A * | 12/1995 | Toyoshi | B62D 5/083 267/273 |
| 5,692,992 | A * | 12/1997 | Arvidsson | B63H 21/213 192/30 W |
| 5,851,006 | A * | 12/1998 | Spillner | B62D 5/083 267/273 |
| 6,308,797 | B1 * | 10/2001 | Hacker | B62M 25/06 180/230 |
| 6,374,691 | B1 * | 4/2002 | Grundberg | B63H 21/213 440/86 |
| 8,342,770 | B2 * | 1/2013 | Soulier | B64D 27/26 403/150 |
| 8,365,856 | B2 * | 2/2013 | Kashiwai | F16H 63/30 180/230 |
| 8,505,888 | B2 * | 8/2013 | Whitaker | F16F 1/16 267/154 |
| 8,573,621 | B1 * | 11/2013 | Reynolds | B60G 3/20 267/273 |
| 9,228,626 | B2 * | 1/2016 | Whitaker | F16F 1/16 |
| 2002/0065169 | A1 * | 5/2002 | Suzuki | B63H 21/22 477/109 |
| 2004/0139795 | A1 * | 7/2004 | Kawakubo | B62M 25/06 73/115.03 |
| 2007/0006673 | A1 | 1/2007 | Peterman et al. | |
| 2009/0012682 | A1 * | 1/2009 | Mathis | F16H 61/0213 701/52 |
| 2009/0249914 | A1 | 10/2009 | Kashiwai et al. | |
| 2011/0226080 | A1 | 9/2011 | Ieda et al. | |

FOREIGN PATENT DOCUMENTS

| | | |
|---|---|---|
| DE | 102010015037 A1 | 10/2011 |
| DE | 102011052494 B3 | 10/2012 |
| DE | 102012209720 A1 | 12/2013 |
| DE | 102012209963 A1 | 12/2013 |
| EP | 1571378 A1 | 9/2005 |
| EP | 2902674 A3 | 10/2015 |
| EP | 3099960 B1 | 11/2017 |
| GB | 2504835 A | 2/2014 |
| JP | 2001-200930 A | 7/2001 |
| JP | 2009-250307 A | 10/2009 |
| JP | 2009-275760 A | 11/2009 |
| JP | 20141852 A | 1/2014 |
| WO | 0003912 A2 | 1/2000 |
| WO | 2015114109 A1 | 8/2015 |

OTHER PUBLICATIONS

DE 102014101189.9—Office Action dated Oct. 10, 2014, 5 pages.
JP 2016-567155—Office Action dated Nov. 9, 2018, 7 pages.
JP 2016-567155—Response to Office Action dated Nov. 9, 2018, filed Feb. 20, 2019, 10 pages.
JP 2016-567155—Decision to Grant dated Apr. 2, 2019, 5 pages.
JP-2016-567155—Search Report w/English translation dated Nov. 15, 2018, 17 pages.

* cited by examiner

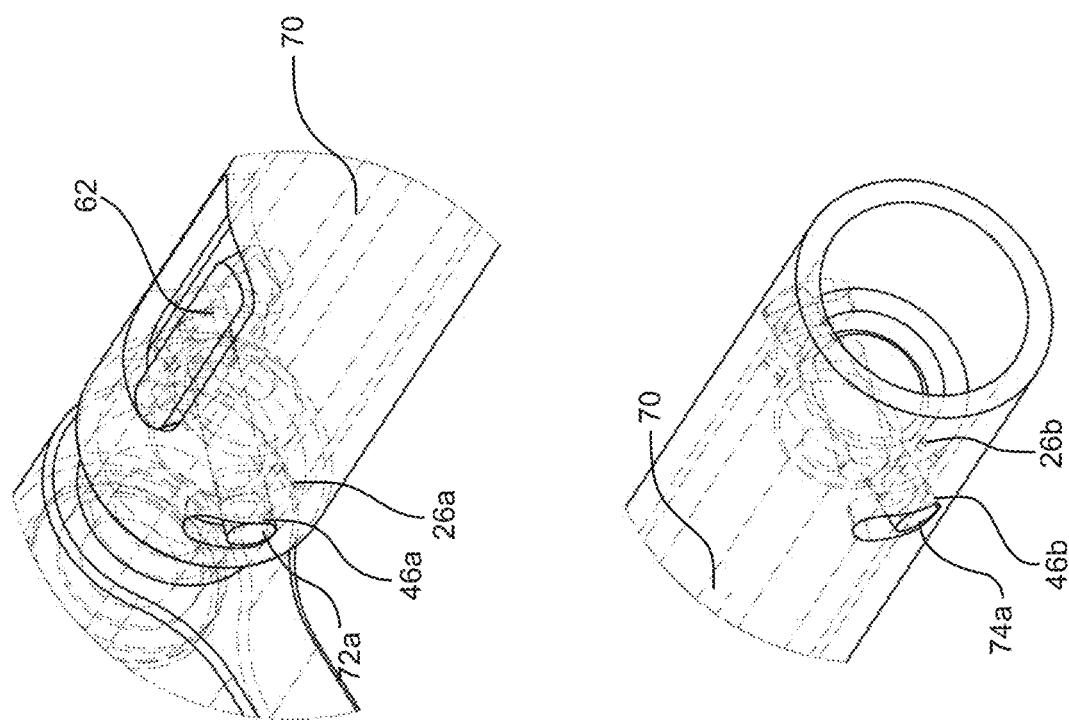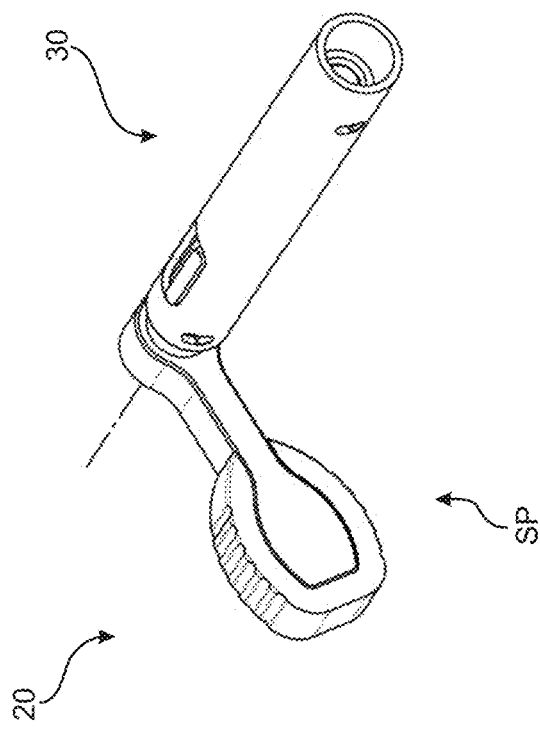
Fig. 9

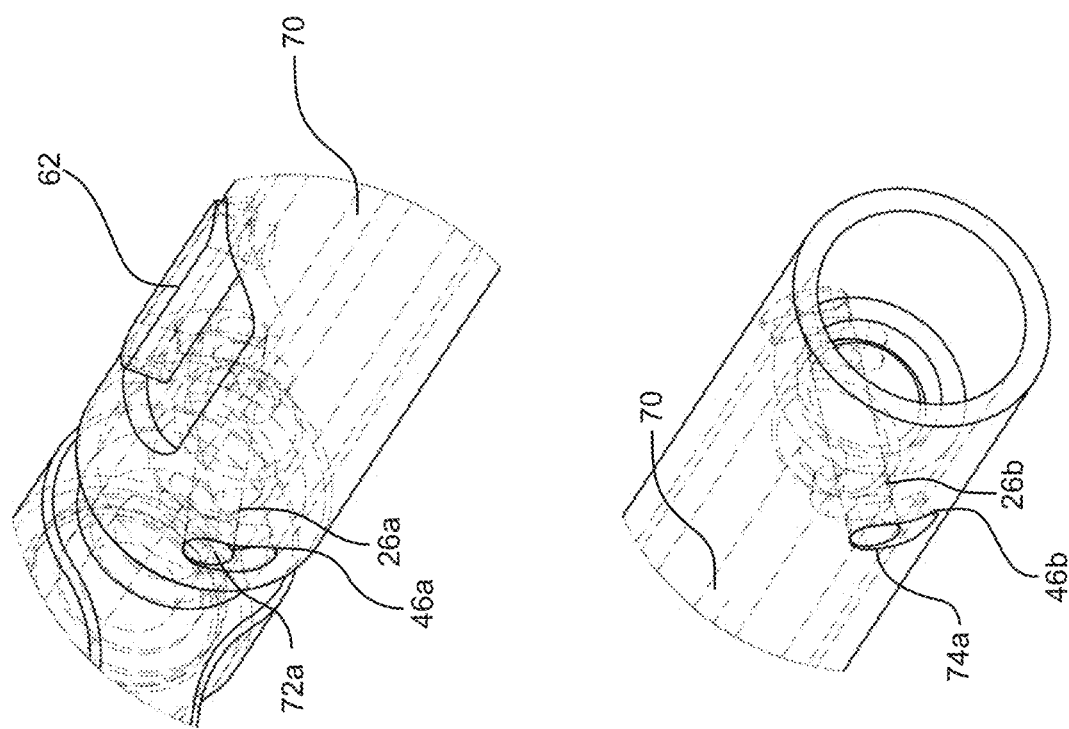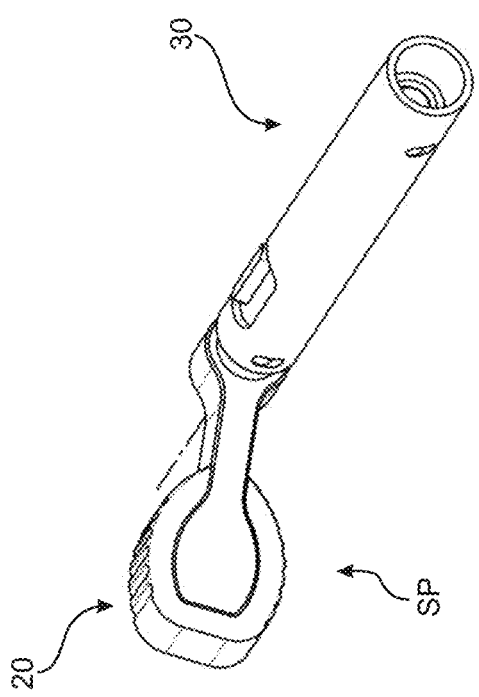
Fig. 10

FORCE TRANSMISSION DEVICE FOR A TRANSMISSION

The present invention pertains to a force transmitting device for a transmission, particularly of a motorcycle, with a shift assist system, as well as to a method for the installation of such a force transmitting device.

It is known to equip vehicles, particularly motorcycles, with shift assist systems. A shift assist system is a system that promotes the shifting operation between the gears of the vehicle. In the application of a shift assist system in a motorcycle, for example, a shifting intention can be detected and used for a shifting preparation. The purpose of such a preparation, for example, is the synchronization of the gearwheels of the gears to be shifted. Based on this synchronization of the gears to be shifted, this may from a geometric point of view lead to no actuation of the clutch being required during the shifting operation. A shift assist system can thereby considerably improve the operating convenience of a vehicle, particularly a motorcycle. Due to this synchronization option, the shift assist system furthermore makes it possible to reduce or even minimize wear within the transmission, particularly of corresponding synchronization means. Such a shift assist system naturally can also be used in transmissions without synchronization option. An input parameter in the form of a shifting intention of the driver is required for conventionally operating a shift assist system. This shifting intention has to be detected as reliably as possible and distinguished, in particular, with respect to an upshifting intention or a downshifting intention. Depending on the intended shifting direction, the shift assist system accordingly ensures, for example, a brief acceleration or deceleration of the current engine power. It furthermore has to be ensured that the corresponding shifting intention can be transmitted to the shift assist system before the actual shifting operation is carried out.

In established solutions, the shifting intention is detected, for example, by means of spring systems. These spring systems are usually located between the shift lever or the shift lever device and the transmission. Such spring devices allow relative motions, which can take place at the shift lever output relative to the transmission input. The disadvantage of these solutions can be seen in that these additional components already have to be taken into consideration and installed during the manufacture and construction of the vehicle. A system of this type therefore cannot be retrofitted. In addition to this basic problem, such a shift assist system or detection of the shifting intention respectively also requires additional space. However, this space is only rarely available, particularly in vehicles in the form of motorcycles, and therefore has to be explicitly created due to corresponding construction. In addition to the space requirement, other significant disadvantages of established solutions are the extra costs of this additional component assembly, as well as the correspondingly increased weight.

The present invention is based on the objective of at least partially eliminating the above-described disadvantages. The invention particularly aims to detect a shifting intention with a reduced space requirement and/or a lower weight, preferably in a retrofittable fashion.

The above-defined objective is attained by means of a force transmission device with the characteristics of claim 1 and a method with the characteristics of claim 13. Other details and characteristics of the invention can be gathered from the dependent claims, the description and the drawings. In this context, characteristics and details described with reference to the inventive force transmitting device naturally also apply to the inventive method and vise versa such that mutual reference respectively is or can always be made with regard to the disclosure of the individual aspects of the invention.

An inventive force transmission device for a transmission, particularly of a motorcycle, with a shift assist system features a shift input shaft with a shift lever connection for receiving a shifting motion of a shift lever. In addition, a transmission connection is provided for transmitting the shifting motion to a gear shifting gate of the transmission. An inventive force transmitting device is characterized in that the shift input shaft features an energy accumulator for the intermediate storage of at least part of the shifting force such that the relative motion between the shift lever connection and the transmission connection can be realized by changing the shifting force stored in the energy accumulator. The shift lever device is furthermore provided with a sensor device for detecting the relative motion between the shift lever connection and the transmission connection.

According to the invention, the detection of a shifting intention is no longer carried out in a separate force transmitting device, but rather integrated into the shift input shaft itself. In the context of the present invention, the term shift input shaft refers to the part of the transmission, which transmits the shifting motion to the gear shifting gate of the transmission. The gear shifting gate of the transmission is usually mounted rotatably about a gate axis. In this case, the shifting axis of the shift input shaft preferably is aligned parallel to this gate axis. In other words, at least the majority of the shift input shaft is in the installed state located within the motorcycle, for example within a transmission case. The shift lever connection serves for directly or indirectly connecting a shift lever, which may be realized, for example, in the form of a pedal lever.

The force transmitting device according to the present invention is divided into three essential sections. These sections consist of the shift lever connection, the shift input shaft and the transmission connection. In an inventive force transmitting device, the transmission connection can directly transmit the corresponding shifting force into the transmission. In contrast to established solutions, it is no longer necessary to arrange a separate shifting sensor system on the transmission connection such that additional structural space is likewise no longer required at this location. In fact, it is possible to exchange an existing shift input shaft with an inventive force transmitting device and to thereby retrofit the respective vehicle with the inventive functionality.

According to the invention, there is a distinction between two motions. If the driver of the vehicle intends to carry out a shifting operation in the transmission, the driver exerts a corresponding shifting force upon the shift lever connection and thereby sets this shift lever connection in motion. This general motion is a motion of the shift lever connection relative to the vehicle. However, this motion has two components. On the one hand, a superordinate motion component of this shift lever connection respectively acts relative to the vehicle or the transmission, but a motion of the shift lever connection relative to the transmission connection may on the other hand also take place depending on the force situation. The function of the energy accumulator with respect to a shifting operation is described in greater detail below in individual steps.

When the driver starts the shifting operation, the shifting force on the shift lever connection is increased by the driver such that the shift lever connection starts its motion relative to the vehicle. At the beginning, the counterforce of the transmission applied to the transmission connection is still relatively low and does not suffice for initiating the shifting operation. The transmission connection accordingly does not move while the shift lever connection is moved due to the increase of the shifting force. This relative motion is permitted due to the fact that the shift input shaft features an energy accumulator within the force path between the shift lever connection and the transmission connection, wherein said energy accumulator makes it possible to store the increasing shifting force generated due to said relative motion. The increase of the shifting force in the intermediate energy accumulator takes place until the equilibrium of forces at the transmission connection reaches the required shifting force. In other words, a defined time period elapses until this equilibrium of forces for the shifting force is reached, wherein this time period is dependent on the distance, which the shift lever connection has traveled relative to the transmission connection during this time period. Once this equilibrium of forces is reached, the shifting operation takes place in the transmission. In this way, the counterforce within the transmission respectively is reduced or can be reduced such that a partial or even complete relaxation of the energy accumulator and therefore a release of the shifting force take place either slowly or abruptly. This shifting operation can accordingly be carried out with the shifting force stored in the energy accumulator and therefore without or with only a slight additional motion of the shift lever connection relative to the vehicle.

The preceding description of a shifting operation elucidates that a relative motion is now possible within the force transmitting device and associated with new detecting options. Exactly this relative motion between the shift lever connection and the transmission connection can be reliably detected by means of the inventive sensor device provided. It is preferred that this sensor device and accordingly also the shift lever connection, the transmission connection and the energy accumulator are designed for a bifunctional operation. This means that upshifting, as well as downshifting, can be realized in accordance with the above-described pattern.

It should furthermore be noted that the energy accumulator may be realized, for example, in the form of a spring device. In the context of the present invention, however, it is naturally also possible to use more complex solutions such as, for example, elastomer, fluidic or pneumatic solutions as energy accumulators. It is preferred that the function of a torsion spring or a torque rod, which is described in greater detail further below, can be used as energy accumulator.

In the context of the present invention, any device capable of detecting the defined relative motion between the shift lever connection and the transmission connection may be used as sensor device. For example, electric or electronic sensors such as Hall sensors or resistance sensors may be used in this case. Simple mechanical switches or optical systems would naturally also be conceivable in the context of the present invention. The quintessential function of the sensor device is the ability to detect the relative motion, wherein a redundant design of such a sensor arrangement may naturally also be advantageous.

A decisive advantage of the present invention can be seen in that this force transmitting device can replace an existing shift input shaft on a vehicle, particularly on a motorcycle. In this respect, existing vehicles or existing transmissions can also be subsequently retrofitted or equipped with this detecting option for a shift assist system. In new constructions, it is now no longer necessary to make available additional structural space for the corresponding detecting function for the shift assist system. In addition to the reduced complexity, this also leads to significantly reduced costs, space savings and weight savings for the transmission and for the vehicle.

According to the present invention, it is advantageous, in particular, if the entire shifting device is set in motion, particularly in rotation, during a shifting operation. Consequently, the shift lever connection, as well as the shift lever itself, and the transmission connection are in motion depending on the respective point in time. The corresponding motions may refer to translatory, rotatory or mixed motions, wherein rotary motions or lever motions are preferred in accordance with the invention.

In this case, the sensor device may operate qualitative as well as quantitative. For example, it is possible to detect if and in which direction the relative motion has actually taken place in a purely qualitative fashion. A quantitative detection may be advantageous if a false detection should be prevented. In a quantitative detection of the relative motion, it is therefore possible to adjust and even subsequently vary defined threshold values in order to prevent maloperation in an even more reliable fashion.

The energy accumulator may have a spring characteristic in order to fulfill the corresponding energy accumulator function. In this case, the spring characteristic particularly may be realized adjustably or variably. For example, the spring characteristic may have linear, progressive and/or degressive sections or designs.

The shift input shaft of an inventive force transmitting device may feature a separate bearing arrangement for being movably mounted in the transmission and/or in the vehicle. Such a bearing arrangement particularly is designed for mounting the force transmitting device rotatably. For example, two or more bearing elements, which are axially spaced apart from one another, particularly may be provided for such a bearing arrangement.

It is advantageous if the energy accumulator in an inventive force transmitting device is realized in the form of a rotatory energy accumulator, particularly in the form of a rotatory spring element, wherein the shift lever connection is designed for a rotational motion relative to the transmission connection. With respect to the shift lever connection, a rotational motion relative to the transmission connection particularly is also a rotational motion relative to the entire vehicle. A corresponding rotatory energy accumulator makes it possible to eliminate gear mechanisms for the conversion between different types of motions. In fact, the energy accumulator may be in direct frictional contact with the shift lever connection and the transmission connection and such that merely a torque can be stored in the energy accumulator for all relative motions. One example of such a rotatory energy accumulator is a torsion spring or the torque rod described further below. Other spring systems or spring devices naturally can also be used for realizing a corresponding energy accumulator in the form of spring elements. In this respect, it is naturally also possible that the energy accumulator represents a combination of different systems such as, for example, a spring device in connection with a pneumatic or hydraulic system. Damping elements or damping devices may naturally also be provided in the energy accumulator.

In an inventive force transmitting device according to the preceding paragraph, it is furthermore advantageous if the relative motion of the shift lever connection is realized in the form of a rotational motion, particularly about the second axis, wherein a shifting angle between the neutral position of the shift lever connection and a shifting position of the shift lever connection results between the alignments of the axis in these two positions. For example, a shifting angle as large as 20° may be sensible such that an overall range of motion of about 40° is defined for the first axis because the shift lever connection can be shifted in two directions by ±20°. In this case, the shifting angle for the respective shifting position is adjusted based on the equilibrium of forces. In this context, it should be noted that the shifting angle is dependent on the equilibrium of forces occurring in the energy accumulator at the respective point in time. For example, the equilibrium of forces within the overall system of the force transmitting device may differ depending on the driving situation and depending on the gear selection or gear level. This means that different shifting angles can naturally also occur for different shifting positions at different gear selection levels. After the shifting operation, a reset from the corresponding shifting position into the neutral position preferably takes place. This means that different shifting positions can in fact be realized for the respective gear levels, but only one zero position is preferably defined for the neutral position.

It is likewise advantageous if the shift lever connection in an inventive force transmitting device is designed for a motion relative to the transmission connection from a neutral position into at least one shifting position, wherein the energy accumulator preferably exerts a prestressing force upon the shift lever connection in the neutral position. This means that a shifting force is always stored in the energy accumulator. In this case, the minimal force is preferably stored in the neutral position of the shift lever connection and therefore in the correlating neutral position of the energy accumulator. This minimal shifting force in the energy accumulator can be referred to as prestressing force. This prestressing force serves for ensuring a more static feel of the shift lever connection for the driver and user of the force transmitting device. It also assists in defining the zero position for the neutral position and promotes a return from the shifting position into the neutral position. Mechanical and geometrical stops naturally may also be provided such that the neutral position and the shifting positions respectively can be defined more precisely or even confined. In this case, the prestress is preferably introduced into the energy accumulator during the assembly such that an adaptation of the prestress can be advantageously carried out at that time.

It is furthermore advantageous if the sensor device in an inventive force transmitting device features at least one detection means, which is arranged stationary relative to the shift lever connection, as well as a sensor means, which is arranged stationary relative to the transmission connection. In this case, the detection means serves as a corresponding detection option for the sensor means. If the sensor device is equipped with a Hall sensor, the detection means may be realized, for example, in the form of a magnet arranged stationary on the shift lever connection. During the motion of the shift lever connection relative to the transmission connection, a correlating and specific motion of the detection means relative to the sensor means accordingly takes place. In this case, a dual arrangement of the detection means and/or sensor means may be provided in order to realize a redundant design. The detection means and the sensor means basically can be arranged arbitrarily. The sensor means may be arranged, for example, on the outer side of the shift lever. This can be realized on the front, top, bottom, rear or even laterally of the shift input shaft. In this case, the sensor means may at least partially protrude, in particular radially, into an opening in the shift input shaft. The detection means could likewise protrude into such an opening from inside. However, it is also possible that the detection means is located completely within an inner tube of the shift lever connection.

In an inventive force transmitting device, it is furthermore advantageous if the sensor device is designed for transmitting the detected relative motion via wireless communication. For example, a radio signal can be transmitted. The energy required for this wireless communication can be obtained, for example, from an energy storage device in the form of a battery or a capacitor. It is also conceivable that the energy accumulator itself or the relative motion between the transmission connection and the shift lever connection generates the energy for realizing this wireless communication. One noteworthy example in this respect is piezo-technology, which makes it possible to convert the relative motion into a brief electrical current. Wiring is no longer required in such an embodiment that the corresponding retrofitting functionality can be realized in an even simpler and more cost-effective fashion.

It is furthermore advantageous if the energy accumulator in an inventive force transmitting device features a torque rod having a shifting end with a shift stop and a transmission end with a transmission stop. In this case, the shift lever connection features a first shift lever connection guide for the shift stop and a second shift lever connection guide for the transmission stop. The transmission connection features a first transmission connection guide for the shift stop and a second transmission connection guide for the transmission stop. In other words, a correlation between energy accumulator, shift lever connection and transmission connection is ensured by means of corresponding stops and guides. The shifting ends and transmission ends of the torque rods respectively concern end sections that are diametrically spaced apart. Viewed in the radial direction, the guides of the shift lever connection and of the transmission connection may at least partially overlap. Consequently, they define clearances in different directions such that the guides of the two components move relative to one another during a relative motion between the transmission connection and the shift lever connection. A torsional force is introduced into the torque rod as a result of the shift stop and the transmission stop respectively being driven by the corresponding guides. The guide length and the respective correlation make it possible to positively define the zero position geometrically. The clearances provide the range of motion for the defined relative motion in this case. A symmetric or essentially symmetric design and support is preferably provided radially on both sides in the shift stop and the transmission stop. In this respect, the stops naturally may be installed subsequently, for example, in the form of inserted pins. A rotational offset between the stops in a relaxed position of the torque rod makes it possible to easily introduce a prestressing force as already described multiple times above.

The force transmitting device according to the preceding paragraph can be enhanced to the effect that the torque rod features on its shifting end and/or transmission end an installation interface for introducing a torsional force into the torque rod. The installation interface may consist, for example, of an interface that deviates from the circular shape. For example, a screwdriver interface or a torx interface may be provided. The torque rod can be correspondingly twisted and thereby provided with a prestressing force during the installation. The insertion of the shift stop takes place in this prestressed position in order to ensure and define this prestressing force in the neutral position of the shift lever connection.

When a torque rod is used in an inventive force transmitting device, it is furthermore advantageous if the angular position of the shift stop relative to the transmission stop is variable. For example, a cross-bore or an offset bore within the torque rod may allow two or more potential operative positions of the shift stop. Such a cross-bore accordingly makes it possible to adjust or even subsequently vary the prestressing force of the torque rod. The stops naturally can also be installed subsequently, as well as exchanged after a prolonged period of use.

It is furthermore advantageous if the sensor device in an inventive force transmitting device has a principal axis that is realized parallel, particularly coaxial, to the shifting axis of the shift input shaft. In other words, the sensor device extends the shift input shaft in the axial direction. It is particularly combined with a sensor device, the radial dimension of which is smaller than or equal to the radial dimension of the shift input shaft. Consequently, the sensor device is set back from or ends flush with the surface of the shift input shaft. This allows an installation in the form of a simple lateral insertion. Furthermore, the space required for the inventive force transmitting device is additionally reduced.

It is likewise advantageous if the shift input shaft in an inventive force transmitting device features an outer tube, wherein the energy accumulator is arranged within this outer tube. In this way, improved protection of the energy accumulator is achieved. In addition, the described relative motions between the individual components can thereby also be carried out with the utmost reliability. Any wear or undesirable jamming due to the admission of dirt is effectively prevented. Such an outer tube may furthermore define a corresponding bearing arrangement because the outer tube does not carry out any motion relative to the vehicle or relative to the transmission.

In an inventive force transmitting device, it is furthermore advantageous if the sensor device is arranged on the shift lever connection or on the transmission connection. In other words, the sensor device terminates the force transmitting device on one end. In this way, an effect of the sensor functionality on the structural space is reduced or completely eliminated. The sensor device is also easily accessible, for example, for the cable feed.

The present invention likewise pertains to a method for the installation of a force transmitting device according to the invention, which features the following steps:
  providing a shift lever connection, a shift lever and a transmission connection,
  mounting an energy accumulator on the transmission connection,
  acting upon the energy accumulator with a prestressing force,
  mounting the prestressed energy accumulator with the shift lever connection.

The installation of an inventive force transmitting device makes it possible to achieve the same advantages as those explicitly described above with reference to an inventive force transmitting device. In this respect, the energy accumulator naturally can also be initially mounted on the shift lever connection and ultimately in prestressed form on the transmission connection in a kinematically reversed fashion. An installation interface of the type described above, for example in the form of a torx interface, particularly is used in this case.

Other advantages, characteristics and details of the invention can be gathered from the following description, in which exemplary embodiments of the invention are elucidated in greater detail with reference to the drawings. In this respect, the characteristics disclosed in the claims and in the description may respectively be essential to the invention individually or in any combination. In the schematic drawings:

Figure 4:
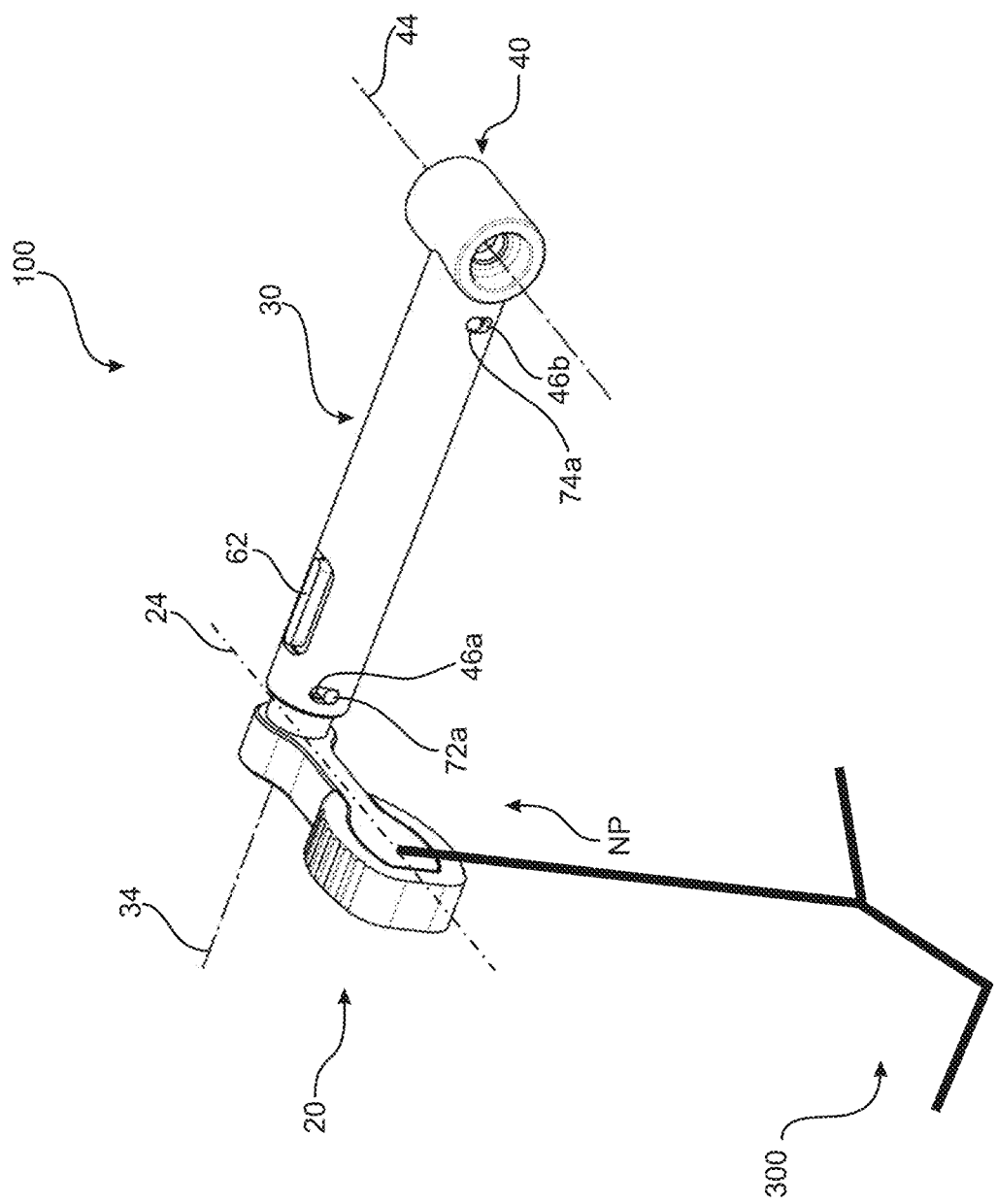
Figure 5:
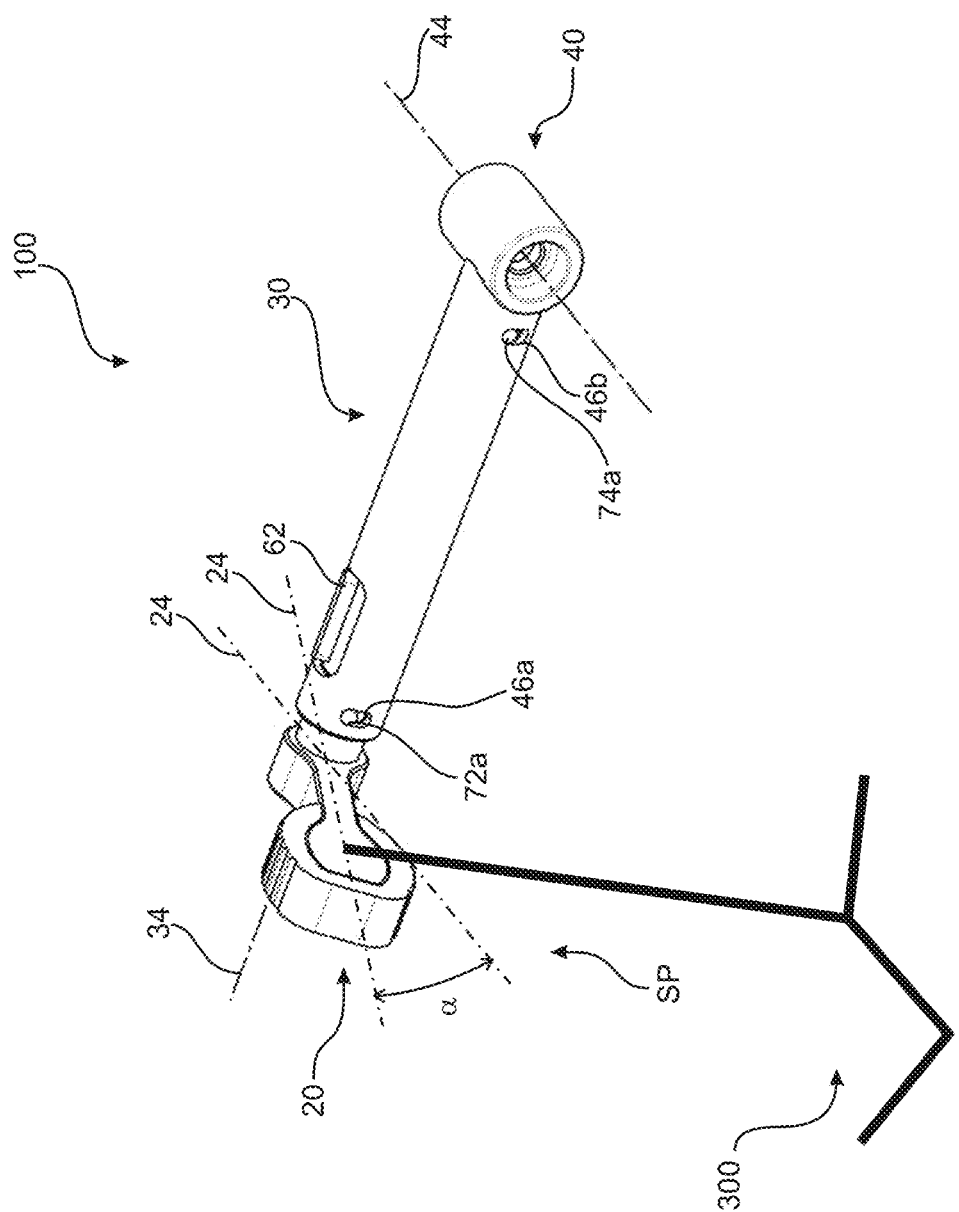
Figure 6:
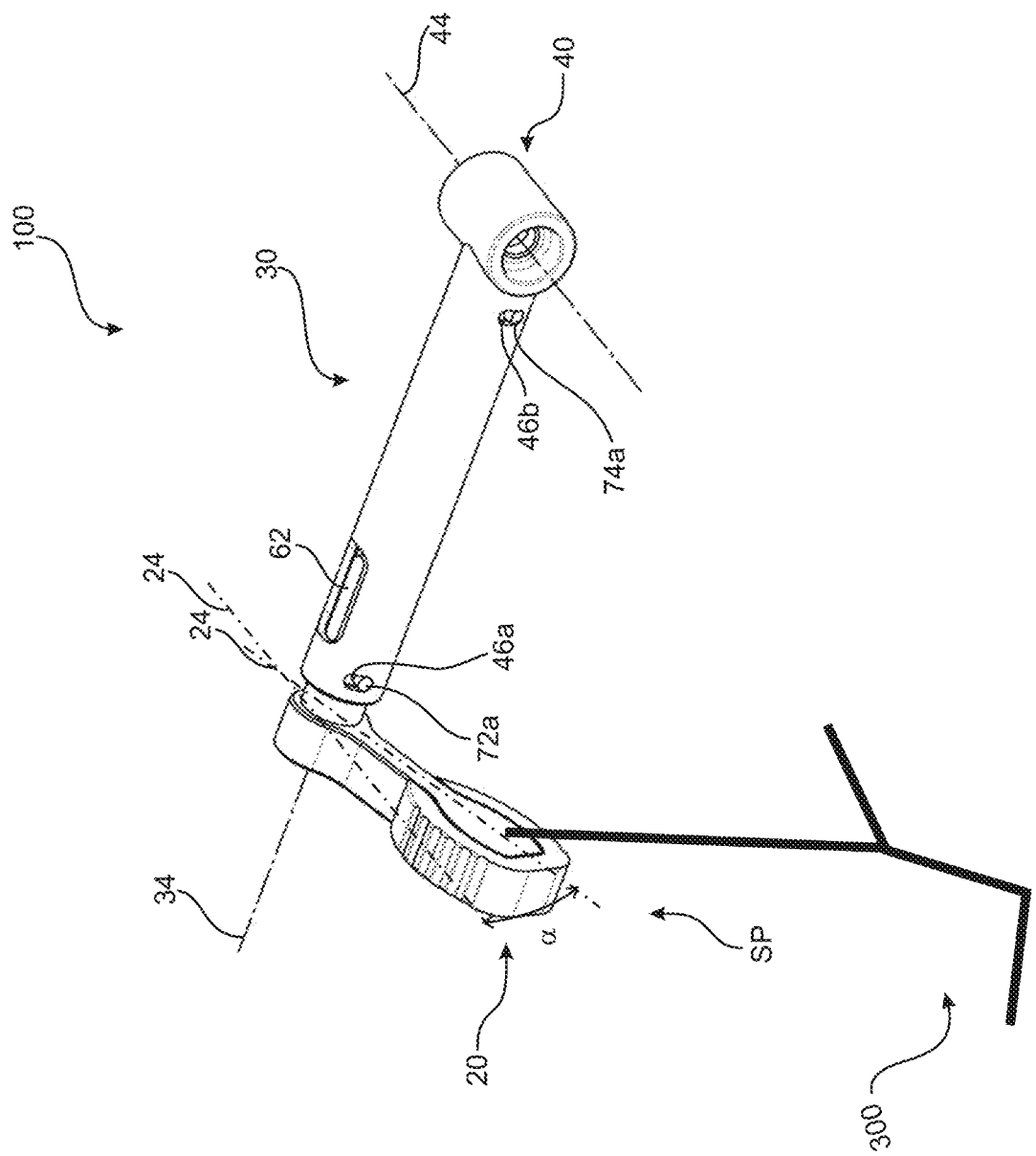
Figure 7:
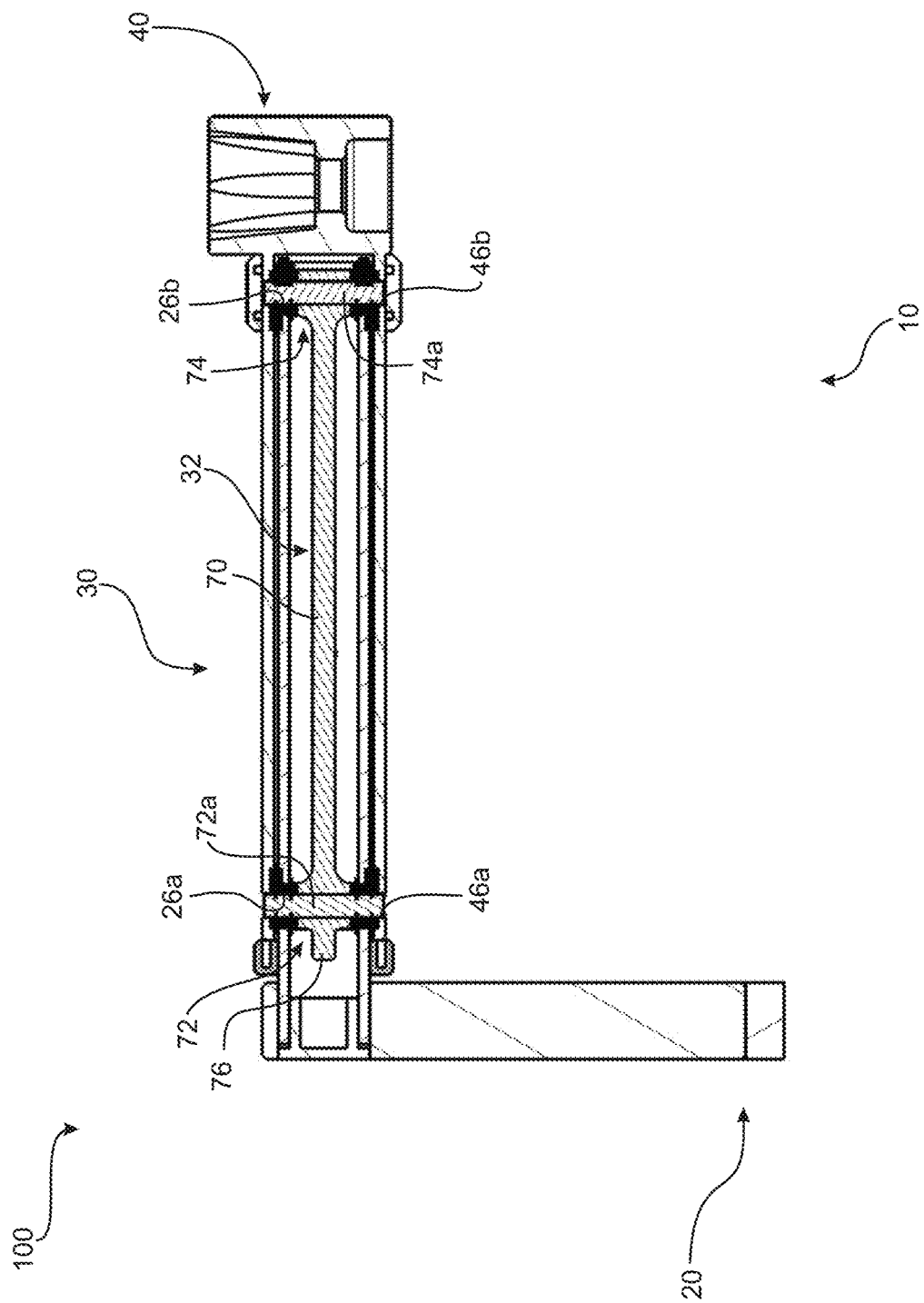
Figure 8:
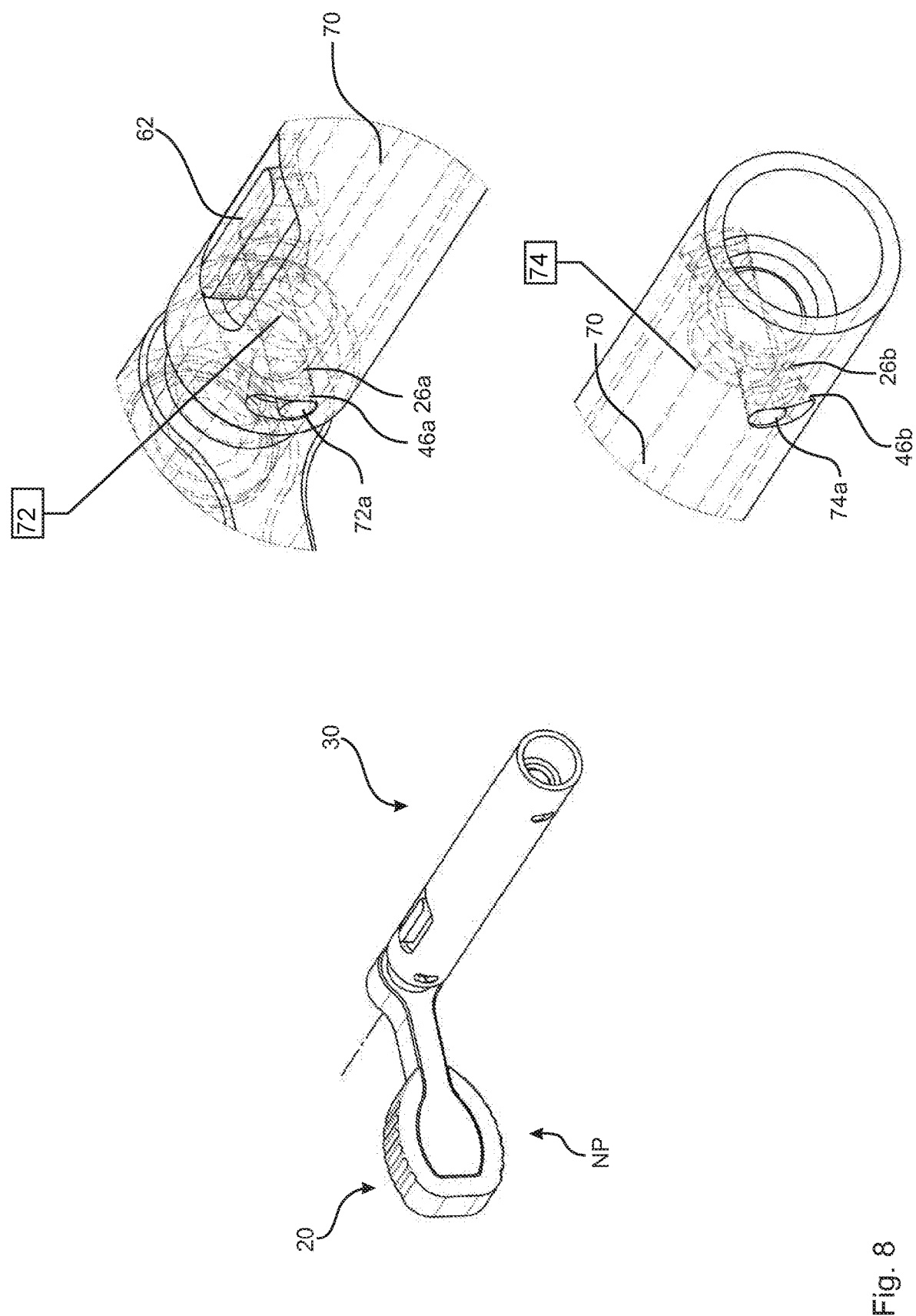
Figure 11:
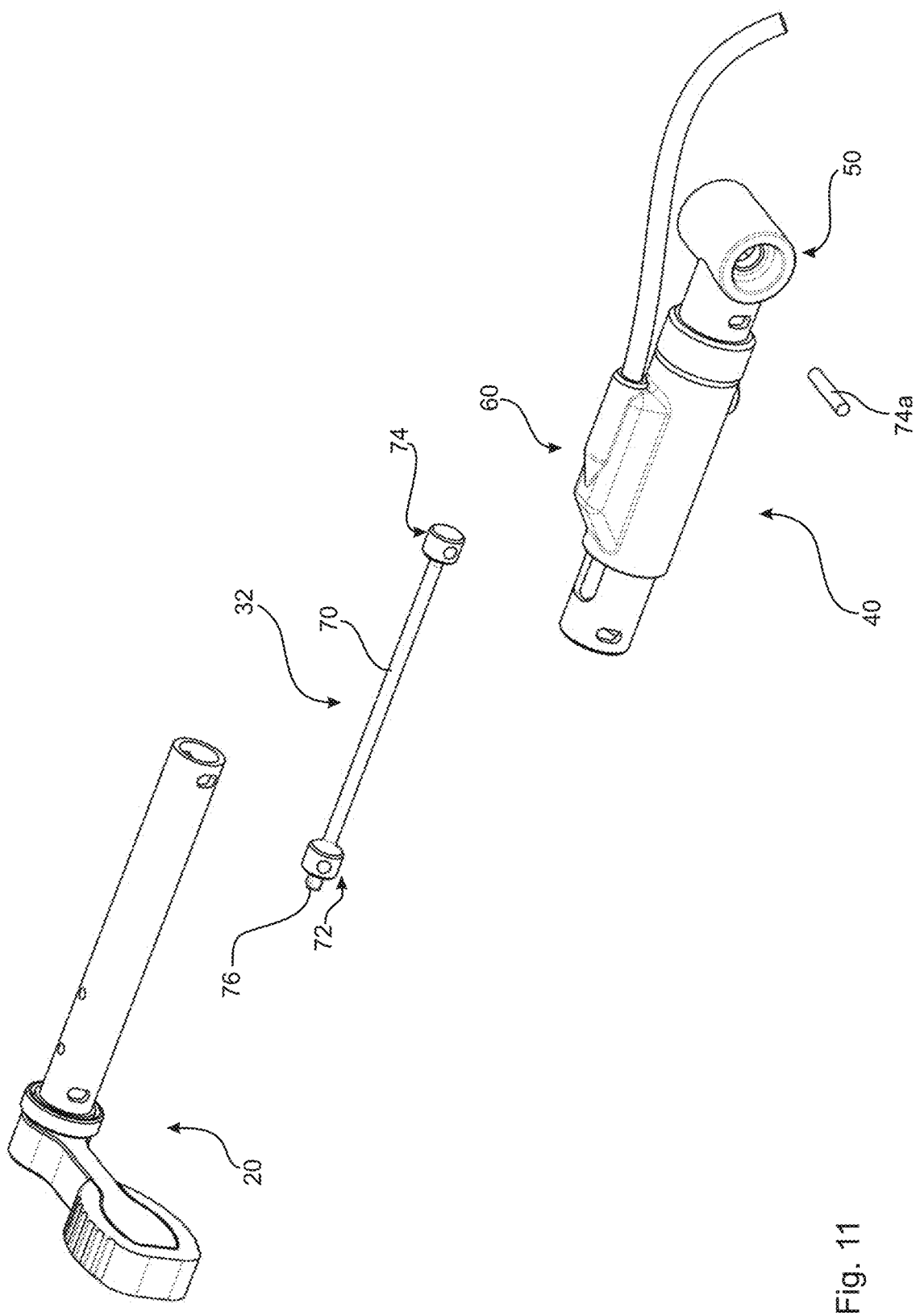
Figure 12:
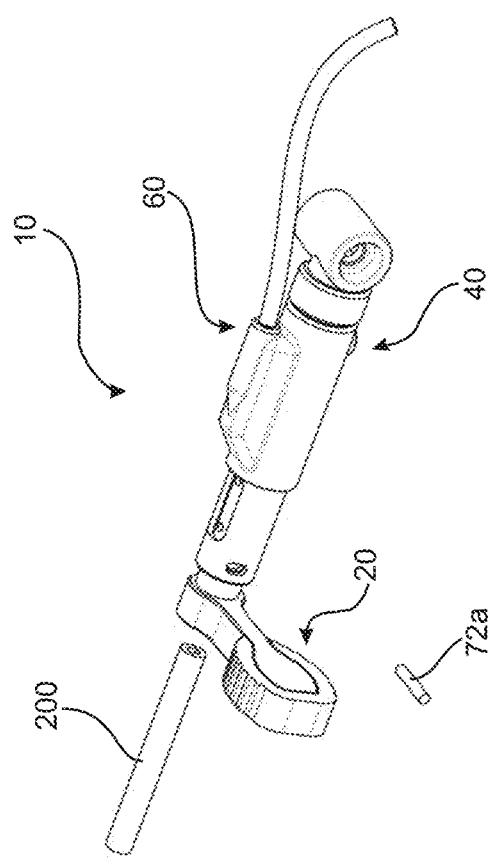
Figure 13:
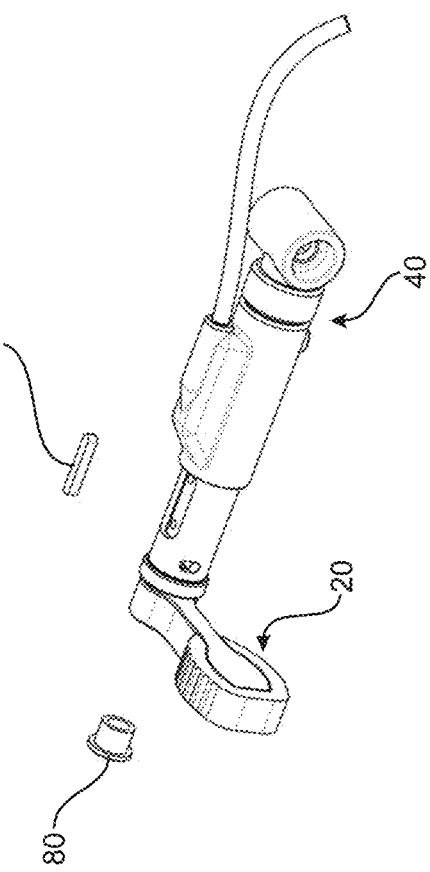

FIG. 4 shows an embodiment of the force transmitting device in the neutral position, FIG. 5 shows the embodiment according to FIG. 4 in a first shifting position, FIG. 6 shows the embodiment according to FIGS. 4 and 5 in a second shifting position, FIG. 7 shows the embodiment in the form of a cross-sectional top view, FIG. 8 shows three separate illustrations of the embodiment in the neutral position, FIG. 9 shows the embodiment according to FIG. 8 in a first shifting position, FIG. 10 shows the embodiment according to FIGS. 8 and 9 in a second shifting position, FIG. 11 shows a first installation state of an inventive force transmitting device, FIG. 12 shows the next installation state after FIG. 11, and FIG. 13 shows the next installation state after FIG. 12.

Figure 1:
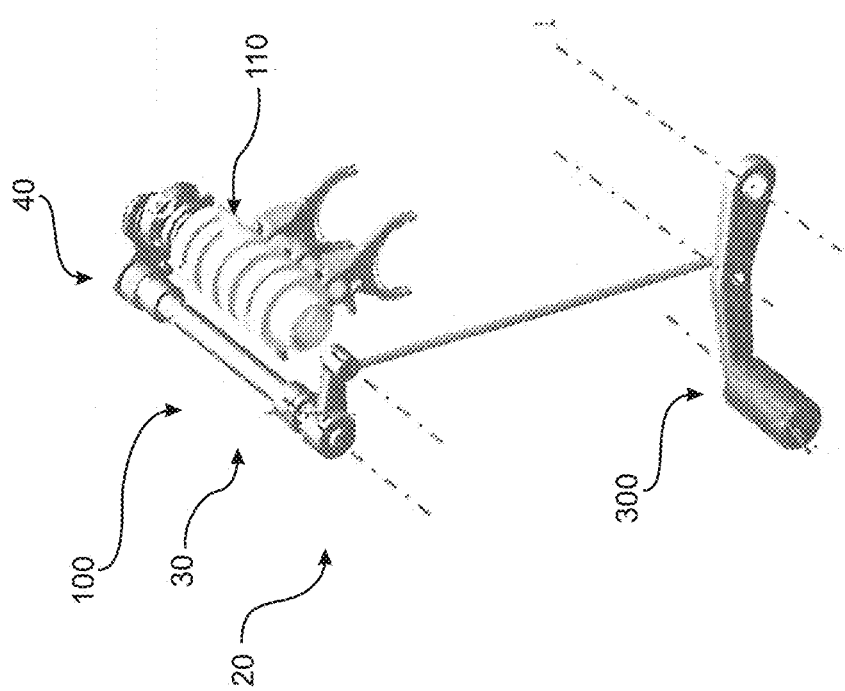
FIG. 1 shows an embodiment of an inventive force transmitting device.

FIG. 1 shows a first embodiment of a force transmitting device 100. A gear shifting gate 110 forms part of a not-shown transmission 200. A shifting motion is carried out in order to rotate this gear shifting gate for a shifting operation. For this purpose, the shift lever 300 is acted upon with a shifting motion by the driver of the vehicle. In FIG. 1, this concerns an upward motion or downward motion of the shift lever 300.

This shifting motion can subsequently be transmitted to the shift lever connection 20 of the force transmitting device via a linkage. Consequently, the shifting motion and therefore also the shifting force are introduced into the inventive force transmitting device 100 at this point. During this process, a relative motion takes place between the shift lever connection 20 and the transmission connection 40 such that a shifting force is intermediately stored in an energy accumulator 32 as described in greater detail further below.

Figure 2:
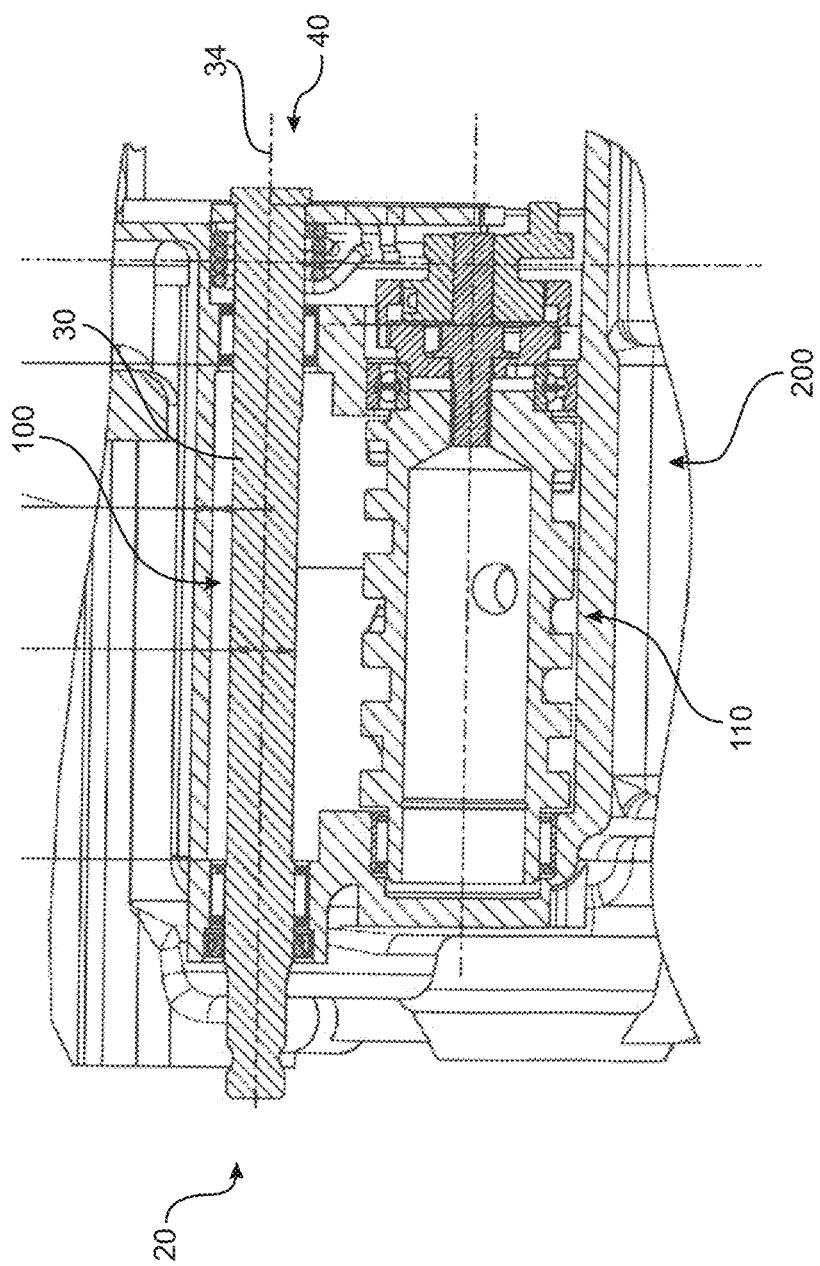
FIG. 2 shows another embodiment in the form of a lateral section.

FIG. 2 shows a schematic cross section through a transmission 200, in which the correlation between the shift input shaft 30 of the force transmitting device 100 and the gear shifting gate 110 is clearly illustrated. The two ends of the force transmitting device 100, i.e. the shift lever connection 20 and the transmission connection 40, are also clearly illustrated in this figure.

Figure 3:
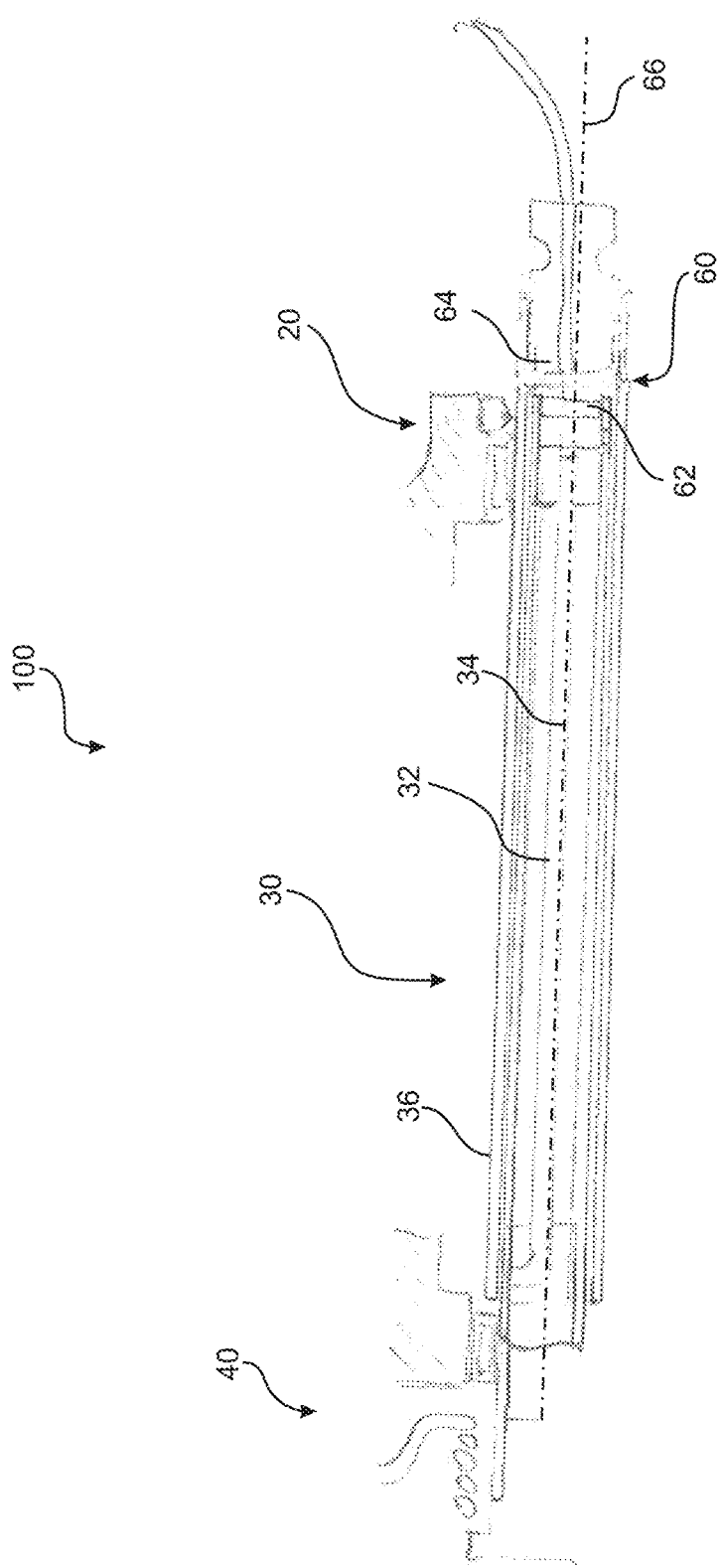
FIG. 3 shows another embodiment in the form of a lateral section.

FIG. 3 likewise shows a schematic cross section through another embodiment of a force transmitting device 100. This figure shows a design that features a hollow shift input shaft 30 with an outer tube. The energy accumulator 32 is located within this outer tube 36. The extending design of the sensor device 60, which axially forms one end of the force transmitting device 100, is also clearly illustrated in this figure.

FIGS. 4-6 show an embodiment without an external case and, in particular, without the sensor device 60. In this case, the three FIGS. 4-6 show three different positions of the shift lever connection 20. However, no shifting operation has taken place yet in any of these three positions, but all three positions rather show the situation shortly before the shifting operation is actually carried out.

FIG. 4 shows the neutral position NP of the shift lever connection 20. In this neutral position, corresponding shift stop 72a and transmission stop 74a located in associated guides 46a and 46b are likewise in a prestressed neutral position. The detection means 62 indicates this neutral position NP. If the driver of the motorcycle now steps on the shift lever connection 20, a rotation of the shift lever connection 20 relative to the transmission connection 40 takes place as illustrated in FIG. 6. The shift lever connection 20 moves downward, wherein a force has to be exerted for this relative motion in order to twist the torque rod 70 within the shift lever 30. This motion can be gathered based on the changed correlation of the stops 72a and 74a in the guides 46a and 46b. The detection means 62 has now moved into a position for the shifting position SP.

The above-described process takes place analogously when the shift lever connection 20 is pressed upward from below. The shift lever connection 20 is also moved from the neutral position NP into a shifting position SP in this case. In both instances, a shifting angle α is adjusted in order to define the corresponding shifting position SP.

Based on the positions according to FIGS. 5 and 6, an equilibrium of forces exists between the shifting force in the energy accumulator 32 and the required shifting counterforce of the transmission 200. At this point, the shifting operation takes place such that the counterforce in the transmission 200 is reduced and at least part of the shifting force stored in the energy accumulator 32 is released. According to FIG. 5, the shift lever 30 now moves downward and the shifting angle α is once again reduced to 0° such that the entire shift lever device 10 is based on FIG. 6 moved into the neutral position.

The design of the energy accumulator 32 in the form of a torque rod 70 is clearly illustrated in the schematic cross-sectional top view according to FIG. 7. The corresponding stops in the form of the shift stop 72a and the transmission stop 74a are arranged on the corresponding shifting end 72 and the transmission end 74. An installation interface 76 with a cross section that deviates from the circular shape likewise forms part of the shifting end 72 in order to carry out the installation described further below. Both stops 72a and 74a consist of inserted pins for engaging with the associated guides 46a, 46b, 26a and 26b.

The correlation of the energy accumulator 32 in the form of the torque rod 70 with the other components is described below with reference to FIGS. 8, 9 and 10. Each of these FIGS. 8-10 once again shows the positions according to FIGS. 4-6, as well as the correlation between the shifting end 72 and the transmission end 74 of the torque rod 70 within the shift lever 30 in the form of two details. The corresponding guides consist of oblong holes that overlap one another. FIG. 8 shows the neutral position NP of the shift lever connection 20. The shift stop 72a located on the shifting end 72 of the torque rod 70 is in a position, in which the two guides 26a and 46a have an upward clearance. The transmission stop 74a located on the opposite transmission end 74 of the torque rod 70 is in a position, in which the two guides 26b and 46b have a downward clearance. Since these guides 46a, 46b, 26a and 26b have clearances in opposite directions, it is ensured that this neutral position NP forms a defined zero position, particularly in a prestressed fashion.

If a motion of the type described in the form of a relative motion with reference to FIGS. 4-6 now takes place, the relations between the guides 26a, 26b, 46a and 46b and the corresponding stops 72a and 74a change as follows. In the shifting position SP according to FIG. 9, the shift lever connection 20 has moved downward. The clearance of the respective guides 26a, 46a and 26b, 46b has now jointly shifted due to the fact that they were partially carried along by a motion of the respective stop 74a or 72a. This on the one hand leads to the detection means 62 being carried along in order to indicate the shifting position SP, and on the other hand to an increase of the torsion, namely of the relative angle between the two pins in the form of the stops 72a and 74a. The same processes also take place during a contrary motion into an opposite shifting position SP as illustrated in FIG. 10. This figure shows how easily and cost-effectively zero positions NP can be defined by means of a corresponding geometric correlation between the guides 26a, 26b, 46a and 46b and how even corresponding limit stops can be defined by means of the shifting positions SP.

FIGS. 11, 12 and 13 show an installation option for an inventive force transmitting device 100. Based on FIG. 10, the installation takes place by inserting the torque rod 70 into the shift lever connection 20. In these figures, two angularly offset bores are respectively illustrated on the shifting end 72 and on the transmission end 74 of the torque rod 70. After the insertion, the transmission connection 40 and therefore the shift lever 30 are attached such that a transmission stop 74a in the form of a pin can ultimately be inserted in order to complete this step. An installed variation is illustrated in this position in FIG. 12. A prestressing force in the form of torsion is now introduced into the torque rod 70 at the installation interface 76. The corresponding shift stop 72a in the form of a pin is inserted as soon as the bore on the shifting end 72 correspondingly overlaps with the associated guides 46a and 26a. According to FIG. 12, a cover 80 is finally attached in order to ensure water tightness and a detection means 62 in the form of a magnet is attached. The force transmitting device 100 is finished by attaching the watertight encapsulated housing of the sensor device 60.

In the preceding explanation of embodiments, the present invention was described with reference to examples only. If technically feasible, individual characteristics of the embodiments naturally may be freely combined with one another without deviating from the scope of the present invention.

REFERENCE LIST

20 Shift lever connection
24 Axis
26a First shift lever connection guide
26b Second shift lever connection guide
30 Shift input shaft
32 Energy accumulator
34 Shifting axis
36 Outer tube
40 Transmission connection
44 Axis
46a First transmission connection guide
46b Second transmission connection guide
60 Sensor device
62 Detection means
64 Sensor means
66 Principal axis of sensor device
70 Torque rod
72 Shifting end
72a Shift stop
74 Transmission end
74a Transmission stop
76 Installation interface
100 Force transmitting device
110 Gear shifting gate 200 Transmission
300 Shift lever
NP Neutral position
SP Shifting position
α Shifting angle

The invention claimed is:

1. A force transmitting device for a transmission with a shift assist system, the force transmitting device comprising:
a shift input shaft including a shift lever connection for receiving a shifting motion of a shift lever and a transmission connection for transmitting the shifting motion to a gear shifting gate of the transmission, wherein the shift input shaft includes an energy accumulator for intermediate storage of at least part of a shifting force such that relative motion between the shift lever connection and the transmission connection is realized by changing the shifting force stored in the energy accumulator,
wherein the shift input shaft further includes a sensor device for detecting the relative motion between the shift lever connection and the transmission connection,
wherein the energy accumulator includes a torque rod comprising (i) a shifting end that includes a shift stop and (ii) a transmission end that includes a transmission stop,
wherein the shift lever connection includes a first shift lever connection guide for the shift stop and a second shift lever connection guide for the transmission stop,
wherein the transmission connection includes a first transmission connection guide for the shift stop and a second transmission connection guide for the transmission stop,
wherein the shift input shaft includes an outer tube and the outer tube of the shift input shaft surrounds the torque rod,
wherein a movement of the shift stop is guided and limited by the first shift lever connection guide and the first transmission connection guide,
wherein a movement of the transmission stop is guided and limited by the second shift lever connection guide and the second transmission connection guide,
wherein the shift stop comprises a pin that is separately and independently guided and limited by the first shift lever connection guide having an oblong shaped hole and the first transmission connection guide having an oblong shaped hole, and
wherein the transmission stop is another pin that is separately and independently guided and limited by the second shift lever connection guide having an oblong shaped hole and the second transmission connection guide having an oblong shaped hole.

2. The force transmitting device according to claim 1, wherein the energy accumulator is a rotatory energy accumulator, and
wherein the shift lever connection is designed for carrying out a rotational motion relative to the transmission connection.

3. The force transmitting device according to claim 1, wherein the relative motion of the shift lever connection is a rotational motion, and
wherein a shifting angle between a neutral position of the shift lever connection and a shifting position of the shift lever connection results between these two positions.

4. The force transmitting device according to claim 1, wherein the shift lever connection is designed for carrying out a motion relative to the transmission connection from a neutral position into at least one shifting position, and wherein the energy accumulator exerts a prestressing force upon the shift lever connection in the neutral position.

5. The force transmitting device according to claim 1, wherein the sensor device includes at least one detection means, which is stationary relative to the shift lever connection, as well as a sensor means, which is stationary relative to the transmission connection.

6. The force transmitting device according to claim 1, wherein the sensor device is designed for transmitting the detected relative motion via wireless communication.

7. The force transmitting device according to claim 1, wherein the torque rod includes an installation interface for introducing torsion into the torque rod on the shifting end or on the transmission end.

8. The force transmitting device according to claim 1, wherein an angular position of the shift stop relative to the transmission stop is variable.

9. The force transmitting device according to claim 1, wherein the sensor device has a principal axis that is parallel to a shifting axis of the shift input shaft.

10. The force transmitting device according to claim 1, wherein the shift input shaft includes an outer tube, and
wherein the energy accumulator is arranged within the outer tube.

11. The force transmitting device according to claim 1, wherein the sensor device is arranged on the shift lever connection or on the transmission connection.

12. The force transmitting device of claim 1, wherein the shift stop, the transmission stop, the first shift lever connection guide, the second shift lever connection guide, the first transmission connection guide and the second transmission connection guide define and limit the relative motion between the shift lever connection and the transmission connection.

13. A method for installation of a force transmitting device,
wherein the force transmitting device comprises:
a shift input shaft including a shift lever connection for receiving a shifting motion of a shift lever and a transmission connection for transmitting the shifting motion to a gear shifting gate of the transmission, wherein the shift input shaft includes an energy accumulator for intermediate storage of at least part of a shifting force such that relative motion between the shift lever connection and the transmission connection is realized by changing the shifting force stored in the energy accumulator,
wherein the shift input shaft further includes a sensor device for detecting the relative motion between the shift lever connection and the transmission connection,
wherein the energy accumulator includes a torque rod comprising (i) a shifting end that includes a shift stop and (ii) a transmission end that includes a transmission stop,
wherein the shift lever connection includes a first shift lever connection guide for the shift stop and a second shift lever connection guide for the transmission stop,
wherein the transmission connection includes a first transmission connection guide for the shift stop and a second transmission connection guide for the transmission stop,
wherein the shift input shaft includes an outer tube and the outer tube of the shift input shaft surrounds the torque rod, wherein a movement of the shift stop is guided and limited by the first shift lever connection guide and the first transmission connection guide, wherein a movement of the transmission stop is guided and limited by the second shift lever connection guide and the second transmission connection guide, wherein the shift stop comprises a pin that is separately and independently guided and limited by the first shift lever connection guide having an oblong shaped hole and the first transmission connection guide having an oblong shaped hole, and wherein the transmission stop is another pin that is separately and independently guided and limited by the second shift lever connection guide having an oblong shaped hole and the second transmission connection guide having an oblong shaped hole, and wherein the method comprises:

providing the shift lever connection, the shift lever and the transmission connection;

mounting the energy accumulator on the transmission connection;

acting upon the energy accumulator with a prestressing force; and mounting the prestressed energy accumulator with the shift lever connection.

\* \* \* \* \*